United States Patent [19]
Furukawa

[11] Patent Number: 5,055,015
[45] Date of Patent: Oct. 8, 1991

[54] SEAL STRUCTURE FOR ROTARY BODY AND VANE-TYPE ROTARY COMPRESSOR EMPLOYING THE SAME

[75] Inventor: Naoto Furukawa, Kanagawa, Japan

[73] Assignee: Atsugi Motor Parts Company, Limited, Kanagawa, Japan

[21] Appl. No.: 356,057

[22] Filed: May 23, 1989

[30] Foreign Application Priority Data

May 23, 1988 [JP] Japan .............................. 63-67744[U]

[51] Int. Cl.$^5$ ........................ F16J 15/32; F04C 27/00
[52] U.S. Cl. .................................... 418/104; 277/94; 277/235 B; 277/5 B
[58] Field of Search ................... 418/104; 277/37, 39, 277/58, 152, 153, 9, 11, 188 A, 188 R

[56] References Cited

U.S. PATENT DOCUMENTS

| | | | |
|---|---|---|---|
| 3,608,914 | 9/1971 | Harby | 277/235 B |
| 3,825,272 | 7/1974 | Townsend | 277/94 |
| 4,737,087 | 4/1988 | Hertell | 418/104 X |
| 4,743,184 | 5/1988 | Sumikawa et al. | 418/104 X |
| 4,755,115 | 7/1988 | Akaike | 418/104 |
| 4,781,553 | 11/1988 | Nomura et al. | 418/104 |

FOREIGN PATENT DOCUMENTS

138958  9/1987  Japan .

Primary Examiner—Richard A. Bertsch
Assistant Examiner—D. L. Cavanaugh
Attorney, Agent, or Firm—Bachman & LaPointe

[57] ABSTRACT

A seal structure comprises a combination of a dynamic seal assembly which is active while a rotary body is rotating and a static seal assembly which is active while the rotary body is not rotating. The dynamic seal assembly includes a seal member mode of low friction material. On the other hand, the static seal assembly has an elastically deformable seal member. A rotary receptacle bore has two different diameter sections. The dynamic seal assembly is designed and sized to be installed in a smaller diameter section of the bore and the static seal assembly is designed and sized to be installed in a larger diameter section. The seal structure is assembled by inserting the dynamic seal between the smaller diameter bore section via the larger diameter section. Subsequently, the static seal is inserted into the larger diameter section.

32 Claims, 4 Drawing Sheets

SEAL STRUCTURE FOR ROTARY BODY AND VANE-TYPE ROTARY COMPRESSOR EMPLOYING THE SAME

BACKGROUND OF THE INVENTION

1. Field of the Invention

The present invention relates generally to a seal structure for a rotary body, such as a rotary shaft. The invention also relates to a vane-type rotary compressor having a compressor housing and a rotary shaft, between which a seal structure according to the present invention is interposed for establishing liquid-tight and gas-tight seal therebetween.

2. Description of the Background Art

The Japanese Utility Model First (unexamined) Publication (Jikkai) Showa 61-169288 which has been assigned to the common assignee to the present invention, discloses a seal structure for a rotary body to be employed in the vane-type rotary compressor. The seal used in the illustrated arrangement includes a seal lip section and a seal ring. The latter mentioned element includes an annular washer-like backplate member and an elastometric seal ring member which is connected to the annular washer-like member by an annular band. This band is folded over an crimped to secure the two major sections, i.e. the seal lip section and the seal ring member, together.

The seal lip section is disposed on the inboard side of the seal ring in such manner that a portion thereof seats on the inner surface of the portion of the elastometric member which is in contact with the outer periphery of a rotary drive shaft. Upon being heated the crimped metal band and annular washer-like backplate member expand to the point where the elastometric member, which is subject to torque due to its sliding engagement with the drive shaft, begins to rotate with respect to the two metal elements, i.e. the washer-like member and the crimped metal band. This induces friction and associated wear which tends to shorten the life of the seal lip and seal ring.

In order to overcome the foregoing defect in the prior art, Australian Patent Application 77414/87 which corresponds to Japanese Utility Model First (unexamined) Publication No. 62-138958 and has been assigned to the common assignee to the present invention, discloses a seal structure which is not influenced by thermal expansion of the backplate and/or change of the seal ring in restricting rotation of the seal ring with the rotary body. For this end, the seal structure for a rotary body comprises an elastometric seal member disposed between a rotary body and a stationary member for sealing contact with the periphery of the rotary body for establishing a liquid-tight and gas-tight seal, the seal member having a first section to be mounted on the stationary member and a second section sealingly contacting the periphery of the rotary body, a flat metal member having a plane mating with the first section of the seal member, a holder member firmly seated on the stationary member and holding the first section and the flat metal member in an assembled form, and means for restricting movement of the seal member relative to the holder member in circumferential direction. The restricting means is incorporated with one of the flat metal member and the holder member and defines a space for accomodating bulging of the seal member due to elastic deformation thereof.

The prior proposed construction is successful in avoiding influence of expansion and/or change. However, a difficulty is encountered in the prior proposed arrangement in assemblying the seal structure to the rotary machine construction. Namely, as discussed earlier, the prior proposed invention comprises two separated seal members to establish liquid tight seal between a rotary body, such as a rotary shaft. One seal member is coupled with the metallic holder member and formed into a pre-assembly in installation and the other seal member is coupled with a core by insert molded manner as a pre-assembly. In the practical installation, the pre-assembly including the one seal member and the holder is at first forced into a rotary shaft receptacle bore so as to establish a seal therebetween. Thereafter, the secondary pre-assembly including the other seal member and the core, is forced into the rotary shaft receptacle bore for establishing the seal. Both of the pre-assemblies are of equal inner and outer diameters in order to be disposed between a uniform diameter of bore and the rotary shaft. The one seal member is made of a material for establishing liquid tight seal and also having low friction for reducing resistance against rotation of the rotary shaft. In the prior example, the metallic holder member coupled with the one seal member is maintained in contact with the inner periphery of the bore to establish liquid and the one seal is made of a material suitable for establishing liquid tight seal and low friction engagement with the rotary shaft.

In the practical installation to force the first installed pre-assembly, the metallic holder member contacts with the inner periphery of the bore to cause scratching on the inner periphery of the bore. The scratches formed in the inner periphery of the bore forms small gaps between the other seal member for causing leakage of the working fluid and affects for sealing ability of seal structure.

SUMMARY OF THE INVENTION

Therefore, it is an object of the present invention to provide a seal structure for a rotary body, which can eliminate the drawback in the prior proposal and thus can avoid the possibility of the formation of scratches on contacting surfaces of a seal member.

In order to accomplish the aforementioned and other objects, a seal structure, according to the present invention, comprises a combination of a dynamic seal assembly which is active while a rotary body is rotating and a static seal assembly which is active while the rotary body is not rotating. The dynamic seal assembly includes a seal member made of low friction material. On the other hand, the static seal assembly has an elastically deformable seal member. A rotary receptacle bore has two different diameter sections. The dynamic seal assembly is designed and sized to be installed in a smaller diameter section of the bore and the static seal assembly is designed and sized to be installed in a larger diameter section. The seal structure is assembled by inserting the dynamic seal between the smaller diameter bore section via the larger diameter section. Subsequently the static seal is inserted to the larger diameter section.

According to one aspect of the invention, a seal structure for a rotary body for establishing seal between an external periphery of the rotary body and an internal periphery of a rotary body receptacle bore defined within a stationary structure, comprises:

means for defining a first smaller bore section and a second larger bore section in the rotary body receptacle bore, the first and second bore sections intersecting each other;

a first seal assembly disposed within the first bore section and including a first seal member which is active during a rotating state of the rotary body for establishing a seal, and a metallic holder member holding the first seal and having a surface contacting with the inner periphery of the first bore section; and a second seal assembly disposed within the second bore section and including a second seal member which is active during a stationary state of the rotary body for establishing a seal.

According to another aspect of the invention, a vane-type rotary compressor comprises:

a compressor housing unit for defining an internal space therein;

a rotor assembly including a cam ring disposed within the internal space of the compressor housing and defining an oval space to house therein a rotor which carries a plurality of vanes thrustingly disposed in a plurality of and radially extending slit in the rotor;

a drive shaft rigidly connected to the rotor at one end, the driving shaft extending through a cylindrical section of the compressor housing unit and being drivingly connected to a driving power source at the other end via a power train;

a seal structure for a rotary body for establishing a seal between an external periphery of the rotary body and an internal periphery of a rotary body receptacle bore defined within a stationary structure, comprising:

means for defining a first smaller bore section and a second larger bore section in the rotary body receptacle bore, the first and second bore sections intersecting each other;

a first seal assembly disposed within the first bore section and including a first seal member which is active during a rotating state of the rotary body for establishing a seal, and a metallic holder member holding the first seal and having a surface contacting with the inner periphery of the first bore section; and a second seal assembly disposed within the second bore section and including a second seal member which is active during a stationary state of the rotary body for establishing a seal.

The first seal member may comprise an elastometric seal member disposed between a rotary body and a stationary structure for sealing contact with the periphery of the rotary body for establishing a liquid-tight and gas-tight seal, the seal member having a first section mounted on the stationary member and a second section sealingly contacting the periphery of the rotary body. The first seal assembly may further comprise a flat metal member having a plane mating with the first section of the seal member. The metallic holder member is firmly seated on the stationary member and holding the first section and the flat metal member in an assembled form.

The first seal assembly further comprises means for restricting movement of the seal member relative to the holder member in circumferential direction. The restricting means is incorporated with one of the flat metal member and the holder member and defines a space for accomodating bulging of the seal member due to elastic deformation thereof. The restricting means comprises an impression formed in the holder member, which impression is formed on a surface of the holder member mating the first section of the seal member. The holder member is formed with a plurality of the impressions circumferentially arranged at given intervals.

Alternatively, the restricting means comprises a cut-out formed in the holder member, which cut-out is formed on a surface of the holder member mating the first section of the seal member. The holder member is formed with a plurality of the cut-outs arranged at given intervals.

In a further alternative, the restricting means comprises an impression formed in the flat metal plate, which impression is formed on a surface of the metal plate mating the first section of the seal member. The metal plate is formed with a plurality of the impressions circumferentially arranged at given intervals.

The restricting means may also comprise a cut-out formed in the flat metal plate, which cut-out is formed on a surface of the metal plate mating the first section of the seal member. The metal plate is formed with a plurality of the cut-outs arranged at given intervals.

The restriction means may further comprise a friction means formed on a plane of one of the flat metal plate and the holder member, which plane mates with one surface of the first section of the seal member. The friction means comprises a knurled surface of the flat metal member mating with the first section of the seal member.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
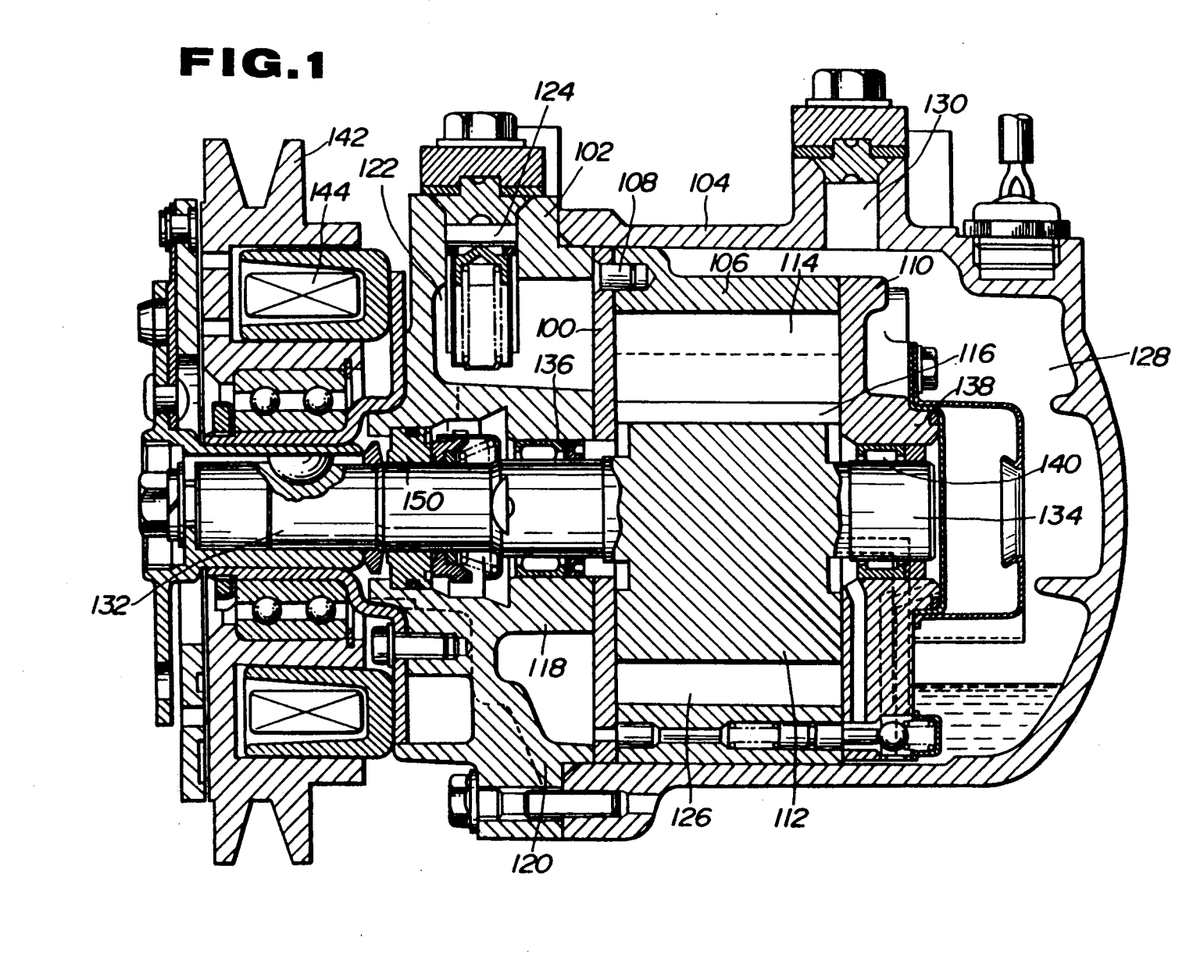
FIG. 1 is a sectional view of a vane-type rotary compressor, to which the preferred embodiment of a seal structure is employed.

Referring now to the drawings, particularly to FIG. 1, a vane-type rotary compressor has a front plate 100, a head cover 102, a housing 104 and a cam ring 106. The front plate 100 comprises a single element which is simply formed of metal plate and is rigidly secured onto the front end of the cam ring 106 by means of fastening bolts 108. The rear end of the cam ring 106 is closed by means of a back plate 110 for defining a clearance within the cam ring for rotatably receiving therein a rotor 112 with a plurality of vanes 114. As will be appreciated, the vanes 114 are received within radially extending slits 116 formed in the rotor 112. Each vane 114 is movable relative to the corresponding slit 116 so that it may protrude from the outer periphery of the rotor 112 and rotatingly and sealingly contact with the inner periphery of the cam ring.

The head cover 102 is formed with an axially extending cylindrical boss-like portion 118. The boss-like portion 118 is arranged coaxially with an outer cylindrical portion 120. The rear ends of the boss-like portion 118 and the cylindrical portion 120 are sealingly engaged with the front plate 100 for defining therebetween an aspiration chamber 122 which is connected to an inlet port 124 for introducing therethrough a refrigerant gas. The aspiration chamber 122 is communicated with working chambers 126 via a suction opening (not shown) which opens on the cam surface of the front plate 100. The working chamber is, in turn, communicated with a discharge chamber 128 defined in the housing 104 by the cam ring 106 and the rear plate 110 via discharge port formed through the rear plate. The discharge chamber 128 is in communication with a discharge port 130. The operation for condensing the refrigerant gas for condensation and thereby removing heat is performed in a per se known manner by rotation of the rotor 112.

The rotor 112 is integrally formed with a drive shaft and a support shaft 134. The drive shaft 132 extends through the boss-like portion 118 of the head cover 102 to project outwardly from the head cover. A bearing assembly 136 is disposed between the inner periphery of the boss-like portion 118 and the outer periphery of the drive shaft 132. Similarly, the support shaft 134 extends from the plane surface of the rotor at the side opposite to the plane surface from which the drive shaft extends. The support shaft 134 is received within a boss-like portion 138 of the rear plate. A bearing 140 is disposed between the inner periphery of the boss-like portion 138 of the rear plate and the outer periphery of the support shaft. In the preferred embodiment, the bearings 136 and 140 comprise roller type needle bearings. An engine driven pulley 142 is associated with the drive shaft 132 via a known clutch assembly 144 which releasably engages the pulley to the drive shaft. Therefore, as the clutch is engaged, the rotor 112 is driven by an automotive engine.

The preferred embodiment of a seal assembly 150 is disposed between the inner periphery of the boss-like portion 118 of the head cover 102 and the outer periphery of the drive shaft. The seal assembly 150 is so designed as to establish a liquid tight and gas-tight seal therebetween.

Figure 2:
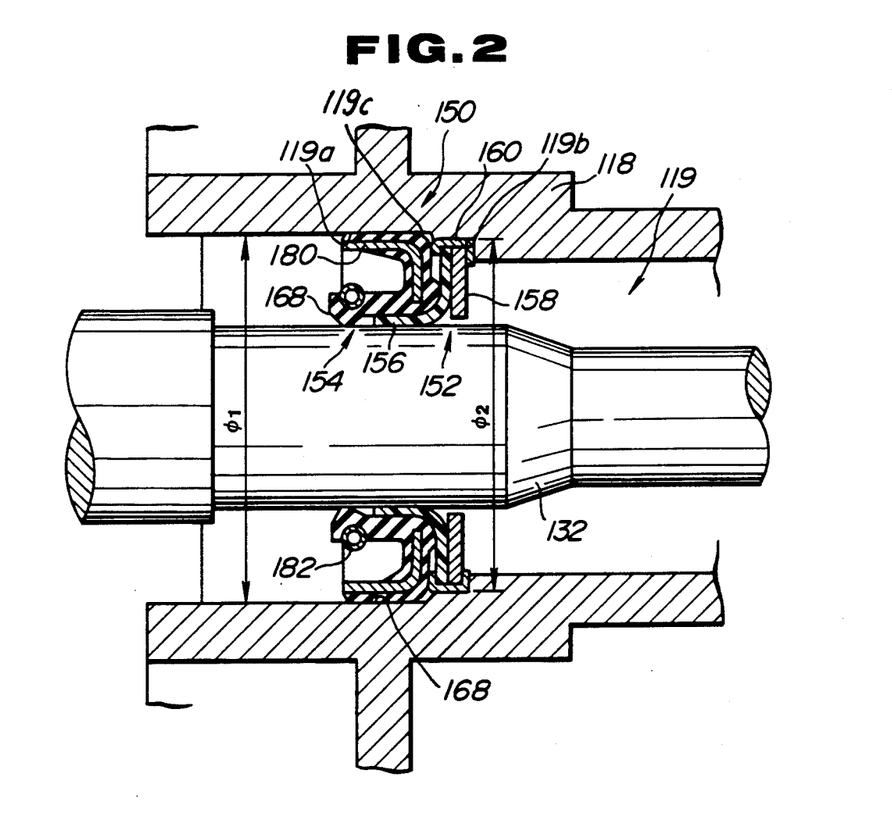
FIG. 2 is a sectional view of the preferred embodiment of a seal structure, according to the invention, which seal structure is disposed between a casing and a rotary shaft.
Figure 3:
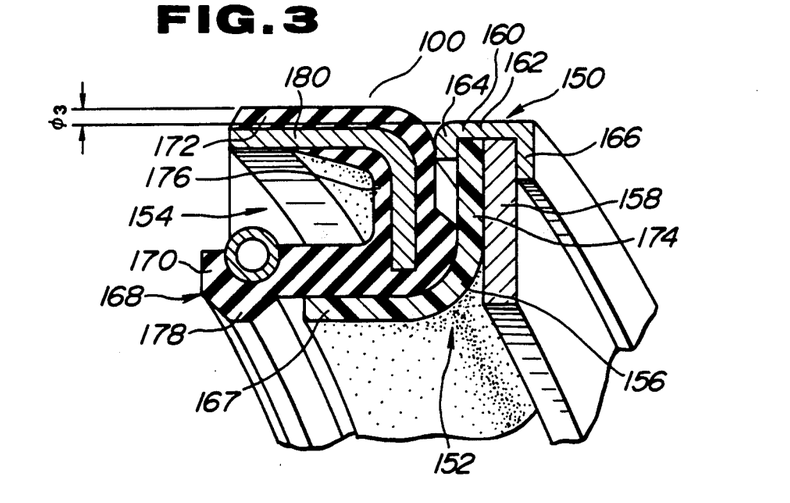
FIG. 3 is an enlarged partial perspective view of a seal structure forming the major part of the preferred embodiment of the seal structure according to the invention.

FIGS. 2 and 3 show the detailed construction of the preferred embodiment of the seal structure according to the invention. The preferred embodiment of the seal structure generally comprises a seal ring assembly 152 and a seal lip assembly 154 similarly to that in the prior art set forth above. The seal ring assembly comprises an elastometric seal ring 156 and a washer-line backplate 158. The seal ring 156 and the backplate 158 are retained in assembled form by means of an annular ring shaped holder member 160. The holder member 160 comprises a circumferentially extending major section 162 and radially extending edge sections 164 and 166 radially and inwardly extending from the axial edges of the major section. With the major section 162 and the edge sections 164 and 166, the holder member 162 is formed into a cross-sectionally channel shaped configuration defining a space for receiving the outer ends of the seal ring 156 and the backplate 158. The holder member 160 is rigidly secured onto the inner periphery of the boss-like portion 120.

The seal ring 156 has a seal tongue section 167 sealingly contacting the outer periphery of the drive shaft 132. The seal ring 156 is cooperative with a seal lip 168 which has coaxially arranged cylindrical sections 170 and 172 and a radially extending section 176 connecting the inner and outer cylindrical sections 170 and 172. An annular projection 178 projecting from the inner periphery of the inner cylindrical section 170. On the other hand, the outer periphery of the outer cylindrical section 172 elastically and sealingly contact with the inner periphery of the boss-like portion 120 of the head cover 102. A core 180 is inserted in the seal lip 168. The core 180 is of cross-sectionally L-shaped configuration and extends below the outer cylindrical section 172 and above the radially extending section 176.

In practical operation, the seal ring 156 is active for establishing the liquid tight and gas-tight seal while the drive shaft rotates, and the seal lip 168 is active for establishing a seal while the drive shaft does not rotate. Therefore, the seal ring assembly 152 thus forms a dynamic seal assembly. On the other hand, the seal lip assembly forms a static seal.

As can be seen from FIGS. 2 and 3, a bore 119 defined by the boss-like section 118 has a larger diameter section 119a and a smaller diameter section 119b intersecting with the larger diameter section at a shoulder 119c. The larger diameter section 119a has an internal diameter $\phi_1$. The smaller diameter section 119b has an internal diameter $\phi_2$. Corresponding to these, the seal ring assembly 152 has an external diameter substantially corresponding to the internal diameter $\phi_2$ of the smaller diameter section 119b, and the seal lip assembly 154 has an external diameter substantially corresponding to the internal diameter $\phi_1$ of the larger diameter section 119a.

In installation, the seal ring assembly 152 is inserted into the bore 119 through the larger diameter section 119a and is forced into engagement with the inner periphery of the smaller diameter section 119b. During installation of the seal ring assembly, by the difference $\phi_3$ of the diameter between the internal diameter $\phi_1$ of the larger diameter section 119a and the external diameter $\phi_2$ of the seal ring assembly 152, the metallic holder member 160 is kept away from the internal periphery of the larger diameter section. Therefore, the internal periphery of the larger diameter section is never scratched by the metallic holder member 160.

Figure 4:
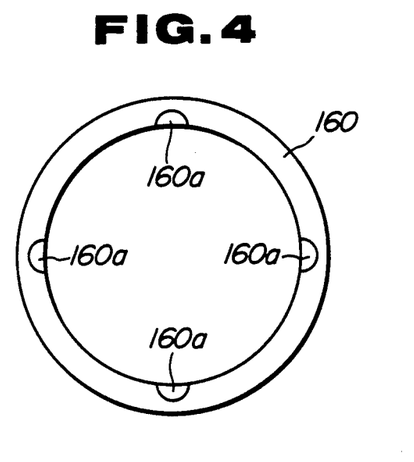
FIG. 4 is a front elevation of a washer-like backplate.
Figure 5:
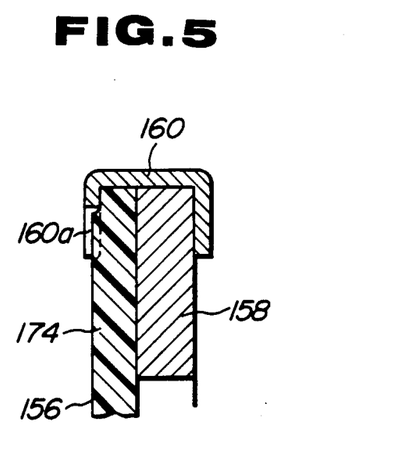
FIG. 5 is a partial enlarged section of a seal ring assembly.

FIGS. 4 and 5 show the further detail of the seal ring assembly. In this preferred embodiment, the seal ring 156 is made of a fluoroplastic, such as TEFLON (trademark). In this embodiment, the holder member 160 is so constructed that it can maintain firm engagement with the assembly of the seal ring 156 and the back plate 158 in order to prevent the seal ring 156 from rotating with the drive shaft 132, which enables the working life of the compressor to be prolonged. This construction is designed to overcome the problem discussed in the introductory section of the disclosure, wherein the metal and elastomeric components of the seal upon becoming heated expand at different rates and become loose to the point where relative movement (slippage) occurs.

In this construction, the seal ring 156 is formed into a configuration essentially L-shaped in cross-section. As set forth, the seal ring 156 has the seal tongue section 167 integrally formed with a radially extending section 174 which has a surface mating with the back plate 158. The holder member 160 clamps the radially extending section 174 of the seal ring 156 and the back plate 158. In order to firmly hold the outer circumferential portion of the seal ring 156 and the back plate 158, the holder member 160 is formed with a plurality of cut-outs 160a, as shown in FIG. 4. The cut-outs 160a essentially semi-circular and are arranged around the circumference of the holder at given intervals. These cut-outs 160a are used as shown in FIG. 5 to define voids into which the circumferential edge portion of the elastomeric seal ring 156 can bulge during the clamping action. The portions of the seal ring 156 which bulge into the cut-outs 160a define a kind of locking block arrangement which prevents relative rotation therebetween. Thus, even though an expansion differential tends to occur between the metal and elastomeric components of the seal, since one of the metal components is locked together with the elastomeric seal ring 156 the tendency of the members to rotate independently is prevented.

Figure 6:
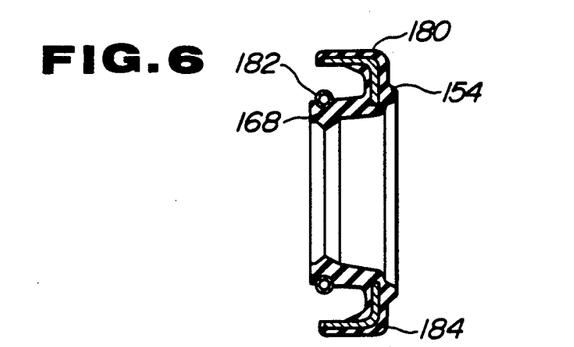
FIG. 6 is a section of a seal lip assembly.

The above described construction is used in combination with a seal lip assembly 154 which is shown in FIG. 6. The seal lip 168 is made of a nitrile rubber. The core 180 associated with the seal lip 168 comprises a shaped metal insert. A garter spring 182 surrounds the lip section and biases the same inwardly into contact with the drive shaft shaft 132. The shaped metal insert 180 is covered with elastomeric material in such manner to define a shoulder section 184 which is arranged to cooperate with the construction shown in FIGS. 4 and 5. This shoulder section 184 is designed to cooperate with the holder member 160 so that the two sections seat snugly together and cooperate to prevent any relative rotation between components of the seal arrangement.

Figure 7:
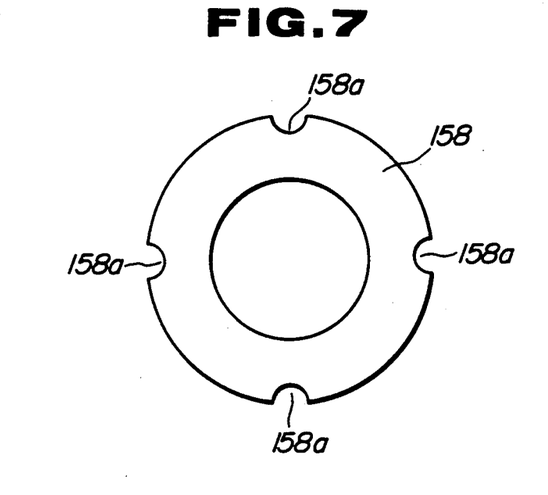
FIG. 7 is a front elevation of the backplate forming a first modification of the preferred embodiment of the seal structure.
Figure 8:
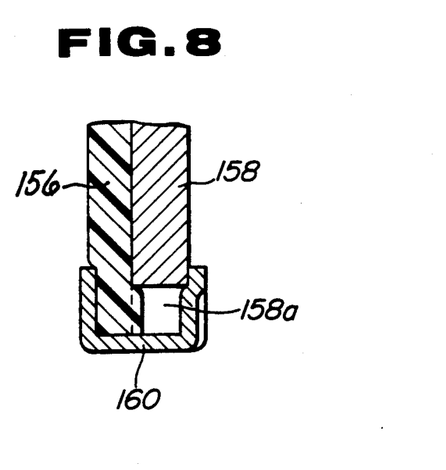
FIG. 8 is a partial enlarged section of the seal ring assembly in the first modification of the preferred embodiment.

FIGS. 7 and 8 show a second seal construction which enables the working life of the compressor to be prolongated. In this arrangement the annular back plate 158 is formed with a plurality of indents or cut-outs 158a about the periphery thereof. When assembled, as shown in FIG. 8, the seal ring 156 and the back plate 158 are clamped together in such a manner that the seal ring 156 is squeezed into the cut-outs 158a formed about the periphery of the back plate 158 and thus provide an interlocking action which even in the event of notable expansion still tends to hold the two members together and prevent relative rotation therebetween. Due to the clamping the holder member 160 is deformed in a manner causing it to partially extend into the cut-outs (see the lower right hand corner of FIG. 8) thus establishing an interlock between the two metal members 158 and 160 of the instant section of the seal. This ensures that relative rotation between these elements is also prevented.

Figure 9:
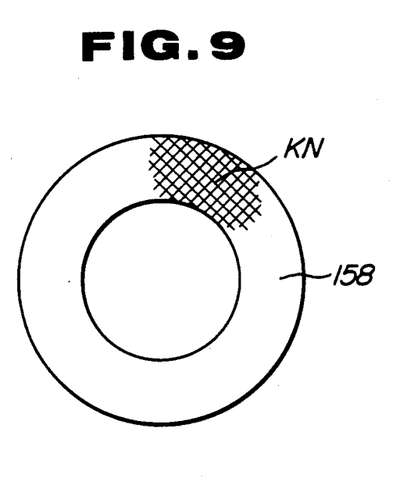
FIG. 9 is a front elevation of the backplate forming a second modification of the preferred embodiment.
Figure 10:
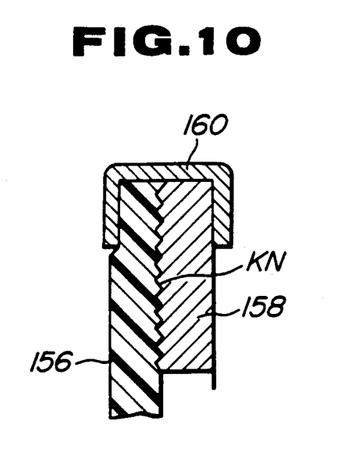
FIG. 10 is a partial enlarged section of the seal ring assembly in the second modification of the preferred embodiment.

FIGS. 9 and 10 show a second seal construction which prolongs the life of the seal and therefore the service life of the device in which it is disposed. In this embodiment the back plate 158 is knurled (KN) and thus provided with a surface which is sufficiently rough to provide a vast number of small indentations into which the elastomeric member 156 can be squeezed to interlock the two members.

Figure 11:
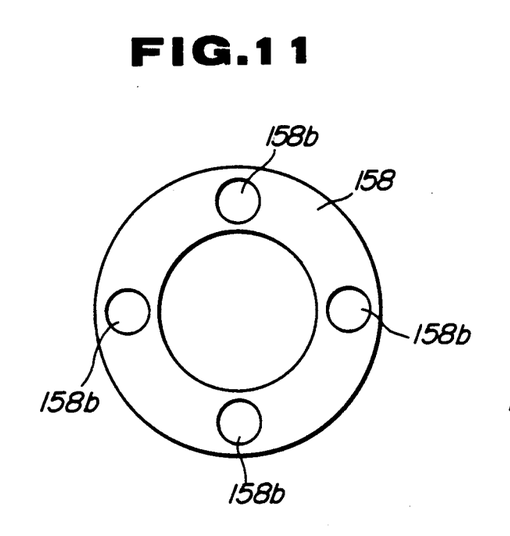
FIG. 11 is a front elevation of the backplate forming a third modification of the preferred embodiment.
Figure 12:
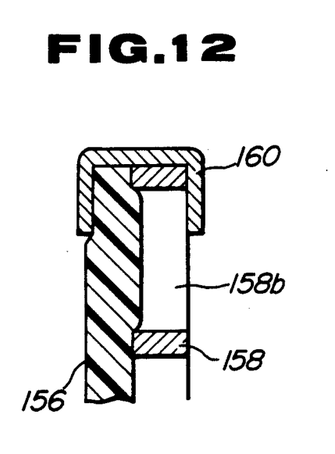
FIG. 12 is a partial enlarged section of the seal ring assembly in the third modification of the preferred embodiment.

FIGS. 11 and 12 show another seal construction which can be used to prolong the life of the assembled article. In this arrangement the back plate 158 is formed with a plurality of openings 158b. In this embodiment the openings 158b are circular and formed by drilling for example. It is of course possible to punch the holes out and thus form burrs on one side. When the seal ring 156 and the back plate 158 are clamped together a portion of the elastomeric seal ring 156 is squeezed into the holes in manner similar to the above embodiments. In the event that the holes are formed by punching, the burrs can be pressed advantageously into the elastomeric member to provide additional interlocking.

Although each of the above disclosed arrangements have been described individually and shown in various modifications of vane compressor it will be clearly understood that all of the features can be and are intended to be used in combination with one or any number of the others in order to derive the maximum benefit. The disclosure in isolation is deemed to be advantageous to claify the individual merit or each arrangement and not detract from the advantages of the others and to further clarify that use of any one or any combination of the features or their equivalents falls within the scope of the present invention which is limited only by the claims set forth hereinbelow.

Furthermore, though the preferred embodiment of the seal structures according to the present invention has been disclosed in terms of a type applied in a vane-type rotary compressor, the same seal structures may be applicable in various devices which have a rotary body rotatable about a stationary member.

What is claimed is:

1. A seal structure for a rotary body for establishing a seal between an external periphery of said rotary body and an internal periphery of a rotary body receptacle bore defined within a stationary structure, comprising:
    means for defining a first smaller bore section having a first diameter and a second larger bore section having a second diameter greater than said first diameter in said rotary body receptacle bore, said first and second bore sections being located adjacent to each other;
    a first seal assembly disposed within said first bore section and including a first seal member formed from an elastomeric material and a metallic holder member holding said first seal member, said metallic holder member having an outer diameter substantially equal to said first diameter and an outer surface contacting the inner periphery of said first bore section; and
    a second seal assembly disposed within said second bore section and including a second seal member formed of an elastic material, said second seal member having an outer surface contacting an inner periphery of said second bore section,
    whereby said metallic holder member is sized to be inserted within said first bore section without scratching the inner periphery of said second bore section.

2. A seal structure as set forth in claim 1, wherein said first seal member is disposed between said rotary body and said stationary structure for sealing contact with the periphery of said rotary body for establishing a liquid-tight and gas-tight seal, said first seal member having a first section mounted on said stationary structure and a second section sealingly contacting the periphery of said rotary body.

3. A seal structure as set forth in claim 2, wherein said first seal assembly further comprises a flat metal member having a plane mating with said first section of said seal member.

4. A seal structure as set forth in claim 3, wherein said metallic holder member is firmly seated on said stationary structure and holding said first section and said flat metal member in an assembled form.

5. A seal structure as set forth in claim 4, wherein said first seal assembly further comprises means for restricting movement of said seal member relative to said holder member in circumferential direction.

6. A seal structure as set forth in claim 5, wherein said restricting means is incorporated with one of said flat metal member and said holder member and defines a space for accommodating bulging of said seal member due to elastic deformation thereof.

7. A seal structure as set forth in claim 6, wherein said restricting means comprises an impression formed in said holder member, which impression is formed on a surface of said holder member mating said first section of said seal member.

8. A seal structure as set forth in claim 7, wherein said holder member is formed with a plurality of said impressions circumferentially arranged at given intervals.

9. A seal structure as set forth in claim 7, wherein said restricting means comprises a cut-out formed in said holder member, which cut-out is formed on a surface of said holder member mating said first section of said seal member.

10. A seal structure as set forth in claim 9, wherein said holder member is formed with a plurality of said cut-outs arranged at given intervals.

11. A seal structure as set forth in claim 7, wherein said restricting means comprises an impression formed in said flat metal plate, which impression is formed on a surface of said metal plate mating said first section of said seal member.

12. A seal structure as set forth in claim 11, wherein said metal plate is formed with a plurality of said impressions circumferentially arranged at given intervals.

13. A seal structure as set forth in claim 7, wherein said restricting means comprises a cut-out formed in said flat metal plate, which cut-out is formed on a surface of said metal plate mating said first section of said seal member.

14. A seal structure as set forth in claim 13, wherein said metal plate is formed with a plurality of said cut-outs arranged at given intervals.

15. A seal structure as set forth in claim 7, wherein said restricting means comprising a friction means formed on a plane of one of said flat metal plate and said holder member, which plane mates with one surface of said first section of said seal member.

16. A seal structure as set forth in claim 15, wherein said friction means comprises a knurled surface of said flat metal member mating with said first section of said seal member.

17. A vane-type rotary compressor comprising:

a compressor housing unit for defining an internal space therein;

a rotor assembly including a cam ring disposed within said internal space of said compressor housing and defining an oval space to house therein a rotor which carries a plurality of vanes thrustingly disposed in a plurality of and radially extending slits in said rotor;

a drive shaft rigidly connected to said rotor at one end, said driving shaft extending through a cylindrical section of said compressor housing unit and drivingly connected to a driving power source at the other end via a power train;

a seal structure for a rotary body for establishing a seal between an external periphery of said rotary body and an internal periphery of a rotary body receptacle bore defined within a stationary structure, comprising:

means for defining a first smaller bore section having a first diameter and a second larger bore section having a second diameter greater than said first diameter in said rotary body receptacle bore, said first and second bore sections being positioned adjacent to each other;

a first seal assembly disposed within said first bore section and including a first seal member formed from an elastomeric material for establishing said seal and a metallic holder member holding said first seal member, said metallic holder member having an outer diameter substantially equal to said first diameter and an outer surface contacting the inner periphery of said first bore section; and a second seal assembly disposed within said second bore section and including a second seal member formed of an elastic material for establishing said seal, said second seal member having an outer surface contacting an inner periphery of said second bore section, whereby said metallic holder member is sized to be inserted within said first bore section without scratching the inner periphery of said second bore section.

18. A vane-type rotary compressor as set forth in claim 17, wherein said first seal member is disposed between said rotary body and said stationary structure for sealing contact with the periphery of said rotary body for establishing a liquid-tight and gas-tight seal, said first seal member having a first section mounted on said stationary structure and a second section sealingly contacting the periphery of said rotary body.

19. A vane-type rotary compressor as set forth in claim 18, wherein said first seal assembly further comprises a flat metal member having a plane mating with said first section of said seal member.

20. A vane-type rotary compressor as set forth in claim 19, wherein said metallic holder member is firmly seated on said stationary structure and holding said first section and said flat metal member in an assembled form.

21. A vane-type rotary compressor as set forth in claim 20, wherein said first seal assembly further comprises means for restricting movement of said first seal member relative to said holder member in circumferential direction.

22. A vane-type rotary compressor as set forth in claim 21, wherein said restricting means is incorporated with one of said flat metal member and said holder member and defines a space for accommodating bulging of said seal member due to elastic deformation thereof.

23. A vane-type rotary compressor as set forth in claim 22, wherein said restricting means comprises an impression formed in said holder member, which impression is formed on a surface of said holder member mating said first section of said seal member.

24. A vane-type rotary compressor as set forth in claim 23, wherein said holder member is formed with a plurality of said impressions circumferentially arranged at given intervals.

25. A vane-type rotary compressor as set forth in claim 24, wherein said restricting means comprises a cut-out formed in said holder member, which cut-out is formed on a surface of said holder member mating said first section of said seal member.

26. A vane-type rotary compressor as set forth in claim 25, wherein said holder member is formed with a plurality of said cut-outs arranged at given intervals.

27. A vane-type rotary compressor as set forth in claim 24, wherein said restricting means comprises an impression formed in said flat metal plate, which impression is formed on a surface of said metal plate mating said first section of said seal member.

28. A vane-type rotary compressor as set forth in claim 27, wherein said metal plate is formed with a plurality of said impressions circumferentially arranged at given intervals.

29. A vane-type rotary compressor as set forth in claim 24, wherein said restricting means comprises a cut-out formed in said flat metal plate, which cut-out is formed on a surface of said metal plate mating said first section of said seal member.

30. A vane-type rotary compressor as set forth in claim 29, wherein said metal plate is formed with a plurality of said cut-outs arranged at given intervals.

31. A vane-type rotary compressor as set forth in claim 24, wherein said restricting means comprising a friction means formed on a plane of one of said flat metal plate and said holder member, which plane mates with one surface of said first section of said seal member.

32. A vane-type rotary compressor as set forth in claim 31, wherein said friction means comprises a knurled surface of said flat metal member mating with said first section of said seal member.

* * * * *